UNITED STATES PATENT OFFICE.

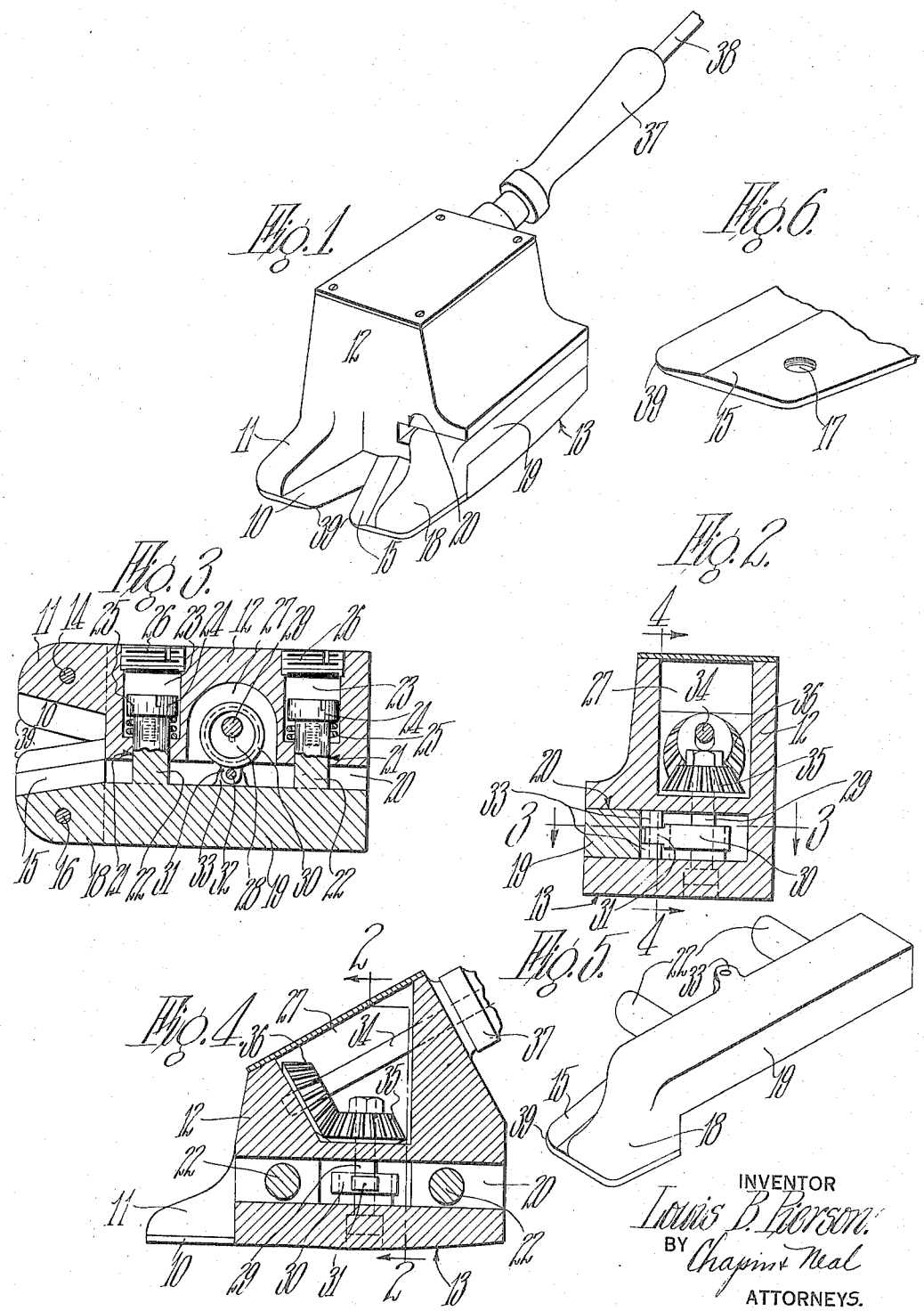

LOUIS B. PIERSON, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

TRIMMING DEVICE.

1,325,908.     Specification of Letters Patent.     Patented Dec. 23, 1919.

Application filed April 9, 1919. Serial No. 288,723.

*To all whom it may concern:*

Be it known that I, LOUIS B. PIERSON, a citizen of the United States of America, residing at Chicopee Falls, in the county of Hampden and State of Massachusetts, have invented certain new and useful Improvements in Trimming Devices, of which the following is a specification.

My invention relates to power operated cutting or trimming devices, and has particular reference to power operated devices for trimming the overflow from the tread of an automobile tire casing, and also for trimming the fin, or surplus material, from the inside edge of the bead of such a casing.

It has for its object the provision of a power operated cutter to take the place of the hand knife now employed for these purposes, and the increase in the speed with which tire casings may be trimmed.

Further objects will appear from a consideration of its description and use.

Referring to the drawings, in which like numerals refer to like parts throughout:

Figure 1 is a perspective view of a trimming device embodying my invention;

Fig. 2 is a transverse section therethrough, taken on line 2—2 of Fig. 4;

Fig. 3 is a sectional plan, taken on line 3—3 of Fig. 2;

Fig. 4 is a longitudinal section, taken on line 4—4 of Fig. 2;

Fig. 5 is a perspective view of the slide carrying the movable cutting member; and Fig. 6 is a fragmentary perspective view of one of the cutting members.

The fixed knife or cutting member 10 is fastened to a forwardly projecting part 11 of a block 12, forming the body of the device. The bottom 13 of the block is preferably substantially flat, although it may be shaped to fit the work if desired, and serves as a guide to direct the cutters into proper relation to the part of the work which is to be trimmed. As shown, the bottom 13 is beveled off slightly on its rearward side, to assist in properly guiding the cutter when the inner edges of tire beads are being trimmed. Attachment of the knife to the block may be made in any suitable manner, as by a screw 14, or by welding.

The movable knife 15 is secured, as by a screw 16 passing through a countersunk hole 17 in the knife, to a projection 18 of a slide 19, or it may be secured thereto by welding. The knives are preferably set in the form of a V, as shown, so as to give a shearing cut. One side of the block 12 has a slot 20 in which this slide moves, and the other side of the block has holes 21. furnishing bearing for two guide members 22 which extend laterally from the slide. Holes 21 are counterbored as at 23, to receive cap screws 24 secured to the ends of guide member 22. Springs 25 between the heads of these cap screws and the inner end of the counterbore serve to urge the cutting members toward each other, as is evident from Fig. 3. These springs are desirable to take up lost motion, and are necessary if a cam be substituted for the eccentric described below, but may be dispensed with, together with the counterbores and cap screws, if desired, in the construction shown. Caps 26 serve to close the outer ends of the counterbores.

The interior of the block 12 is chambered, as shown, at 27, for the purpose of receiving the driving mechanism for reciprocating the cutters. In the present embodiment this driving mechanism consists of an eccentric 28, mounted on a vertical shaft 29. A strap 30 encircles the eccentric, and a lug 31 thereon is pivoted by a pin 32 to suitable lugs 33 on slide 19. Shaft 29 is driven from a shaft 34 by bevel gears 35 and 36. Shaft 34 passes freely through a handle 37, attached to block 12, and terminates in a flexible portion 38, which may be connected to any suitable source of power, such as an electric motor.

The present embodiment of my invention is particularly designed for trimming the fin or overflow occurring at the center of the tread of an automobile tire casing on account of the use of a split mold in the vulcanization of the casing; and also for trimming the sharp edge at the inside of the beads of the casings. In both these instances it is necessary that the cutters shall remove only the part regarded as waste material, and shall not cut into and injure the body of the casing. I prevent this accident in two ways. First, it should be noted that the lengths of the cutting surfaces are short relatively to the length of the guide surface 13. This prevents the cutters being accidentally tipped over so as to cut into the tire, and at the same time insures a sufficient bearing surface to make the cut regular and even. Second, as an additional safeguard, I provide the cutting members with rounded and blunted ends 39, effectually preventing the points of the cutters from digging in to the tire. The provision of these rounded and blunted portions enables the device to be pressed much more firmly against the work than would be the case if the ends were left sharp.

I realize that changes may be made in the details shown while preserving the same function and result, and consider such changes to be within the scope of my invention as set forth in the appended claims. For example, a cam upon shaft 29 can be substituted for the eccentric shown, a suitable abutment being provided on slide 19.

I claim—

1. In a device of the character described, a body portion presenting a substantially unbroken bottom surface serving as a guide for the device, a slot in the body portion spaced from but parallel to the base, a slide mounted for lateral reciprocation in said slot, a fixed cutting member carried by said body portion, a second cutting member secured to the slide, both of the cutting members being substantially in line with the bottom surface of the body portion, and means for reciprocating the slide.

2. A trimming device having a body portion, a knife secured thereto, a slide mounted for movement in the body portion, a shaft in the body portion, an eccentric on the shaft, a strap encircling the eccentric and connected to the slide, means for rotating the shaft, and a second knife secured to the slide.

3. A trimming device having a body portion, a knife secured thereto, a slide mounted for movement in the body portion, a shaft in the body portion, an eccentric on the shaft, a strap encircling the eccentric and connected to the slide, a bevel gear on the shaft, a shaft at an angle to the first shaft, a bevel gear on the second shaft, meshing with the first mentioned gear, a handle attached to the body portion and encircling the second mentioned shaft, and a second knife secured to the slide.

LOUIS B. PIERSON.